F. J. NEWTON.
CONDENSER.
APPLICATION FILED NOV. 8, 1906.

935,923.

Patented Oct. 5, 1909.

WITNESSES:
George W. Tilden.
Marcus L. Byng.

INVENTOR:
Frank J. Newton,
By Albert G. Davis
Att'y

UNITED STATES PATENT OFFICE.

FRANK J. NEWTON, OF SCHENECTADY, NEW YORK, ASSIGNOR TO GENERAL ELECTRIC COMPANY, A CORPORATION OF NEW YORK.

CONDENSER.

935,923.

Specification of Letters Patent.

Patented Oct. 5, 1909.

Application filed November 8, 1906. Serial No. 342,476.

*To all whom it may concern:*

Be it known that I, FRANK J. NEWTON, a citizen of the United States, residing at Schenectady, county of Schenectady, State of New York, have invented certain new and useful Improvements in Condensers, of which the following is a specification.

My present invention relates to electrical condensers, and consists of a device comprising a plurality of metal plates insulated with enamel and so arranged that the apparatus is compact and easy to build, and also durable and efficient in operation.

Figure 1:
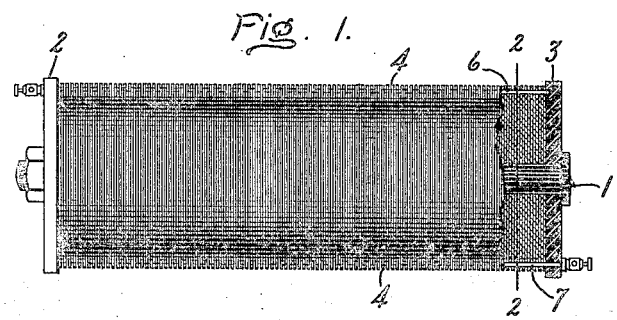
Figure 2:
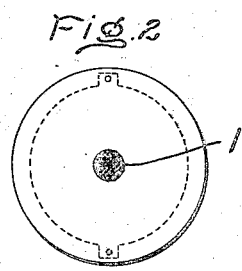
Figure 3:
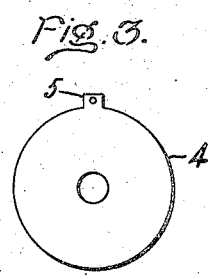

Figure 1 is an elevation partly in section showing the condenser assembled ready for use; Fig. 2 is a sectional elevation on the line 2, 2 of Fig. 1; and Fig. 3 shows one of the metal plates used to build up the structure shown in Fig. 1.

The condenser is assembled on a non-conducting rod 1 of fiber or vulcanized rubber, and comprises non-conducting end plates 2 and 3 between which a plurality of metal plates 4 are securely clamped. These metal plates are of the general outline shown in Fig. 3 and are each provided with a lug 5 adapted to slip over conductive rods or wires 6 and 7 to complete electrical connection between the plates and the circuit with which the condenser is to be used. By arranging alternate plates with the lugs uppermost and the other plates with their lugs downward, half of the plates may be connected to an electrical source of one polarity, while the intermediate plates are connected to the opposite side of the source.

It is, of course, necessary that successive plates of the series should be insulated from each other and instead of using paper or other materials heretofore commonly used in electrical condensers, I rely on a coating of enamel applied directly to the plates of the condensers. This enamel may be of the general type described in United States Patent No. 806,574, Rupley, December 5, 1905, and may be applied according to the general method disclosed in that patent by dipping the plates in the liquid material and then heating or baking to dry and harden the enamel. Such coatings do not readily carbonize even when operated at relatively high temperatures and are in other ways well suited for use as the dielectric of electrical condensers.

To insure good electrical connection between the plates and the conducting rods 5 and 6 which pass through the lugs of the plates, I may leave the lugs uncoated or I may coat them and then scrape away or otherwise remove the coating, to secure the desired electrical contact. The enamel may be applied to all the plates of the series or only to alternate plates and several coatings may be used on each plate to secure the desired resistance and disruptive strength.

The efficiency of a condenser and its electrostatic capacity depends on the nature and thickness of the dielectric as well as on the material and area of the conductors or armatures, and as the coating of enamel above described may be only a fraction of a mill in thickness, it is apparent that the armatures of the condenser are closely associated and arranged to give a high electrostatic capacity.

The metal disks or armatures of the condenser may be of thin aluminum in case a light weight condenser is desired, or they may be of iron or other cheap conductive material.

What I claim as new, and desire to secure by Letters Patent of the United States, is,—

1. An electrical condenser comprising a plurality of enameled metal plates pierced by non-conductive clamping means and rigidly secured thereby.

2. An electrical condenser comprising a plurality of metal plates, some at least of which are enameled, an electrical conductor, and lugs connecting alternate plates to said conductor.

3. An electrical condenser comprising a plurality of metal plates some at least of which are covered with adherent insulating material, lugs on said plates for engagement with electrical conductors, and clamping means passing through the body of said plates for holding them in position.

4. An electrical condenser of cylindrical form, comprising a central non-conductive clamping member carrying rigid end members between which a plurality of enameled metal plates are clamped, and lugs on said metal plates to connect said plates with electrical conductors.

5. An electrical condenser comprising a plurality of metal plates, some at least of which are enameled, lugs on said plates, and a plurality of parallel conductive rods each passing through some of said lugs to make electrical connection with said plates.

In witness whereof, I have hereunto set my hand this 6th day of November, 1906.

FRANK J. NEWTON.

Witnesses:
BENJAMIN B. HULL,
HELEN ORFORD.